United States Patent [19]

Frano

[11] Patent Number: 4,615,140

[45] Date of Patent: Oct. 7, 1986

[54] VINE TIE

[75] Inventor: Francis G. Frano, Hoffman Estates, Ill.

[73] Assignee: Illinois Tool Works Inc., Chicago, Ill.

[21] Appl. No.: 609,073

[22] Filed: May 10, 1984

Related U.S. Application Data

[63] Continuation-in-part of Ser. No. 477,112, Mar. 21, 1983.

[51] Int. Cl.[4] ............................................. A01G 17/06
[52] U.S. Cl. ...................................................... 47/44
[58] Field of Search ...................... 47/47, 44, 45, 46; 24/30.5 P, 17 AP, 20 EE, 22; 248/73, 74.3

[56] References Cited

U.S. PATENT DOCUMENTS

| | | | |
|---|---|---|---|
| 1,945,932 | 2/1934 | Caley | 24/17 AP |
| 4,050,187 | 9/1977 | Geiger et al. | 47/45 |
| 4,165,582 | 8/1979 | Skaug | 47/47 |
| 4,241,727 | 12/1980 | Toti | 24/20 EE |
| 4,317,262 | 3/1982 | Wells, Jr. | 24/17 AP |
| 4,329,762 | 5/1982 | Maidhof | 47/44 |

FOREIGN PATENT DOCUMENTS

| | | | |
|---|---|---|---|
| 1013616 | 12/1965 | United Kingdom | 248/74 |
| 664615 | 5/1979 | U.S.S.R. | 47/44 |

Primary Examiner—Robert E. Bagwill
Assistant Examiner—Bradley M. Lewis
Attorney, Agent, or Firm—J. P. O'Brien; T. W. Buckman

[57] ABSTRACT

A one-piece, integrally formed tie apparatus is provided for releasably suspending a vine or the like from a line. A line engaging portion releasably engages the line and a vine holding portion loosely surroundingly holds the vine or the like. The vine holding portion comprises an elongate flexible arm integrally depending from the line engaging portion and elastically deformable to define a loop for loosely surrounding the vine or the like. A first coupling means is integrally formed with the flexible arm. A second coupling means is adapted to connect with the first coupling means to form the flexible arm into a closed loop around the vine or the like. One of the coupling means is responsive to application of a predetermined amount of force to the flexible arm substantially in at least one direction for releasing the other coupling means to open the loop and permit removal of the vine or the like.

7 Claims, 14 Drawing Figures

U.S. Patent  Oct. 7, 1986  Sheet 1 of 2  4,615,140
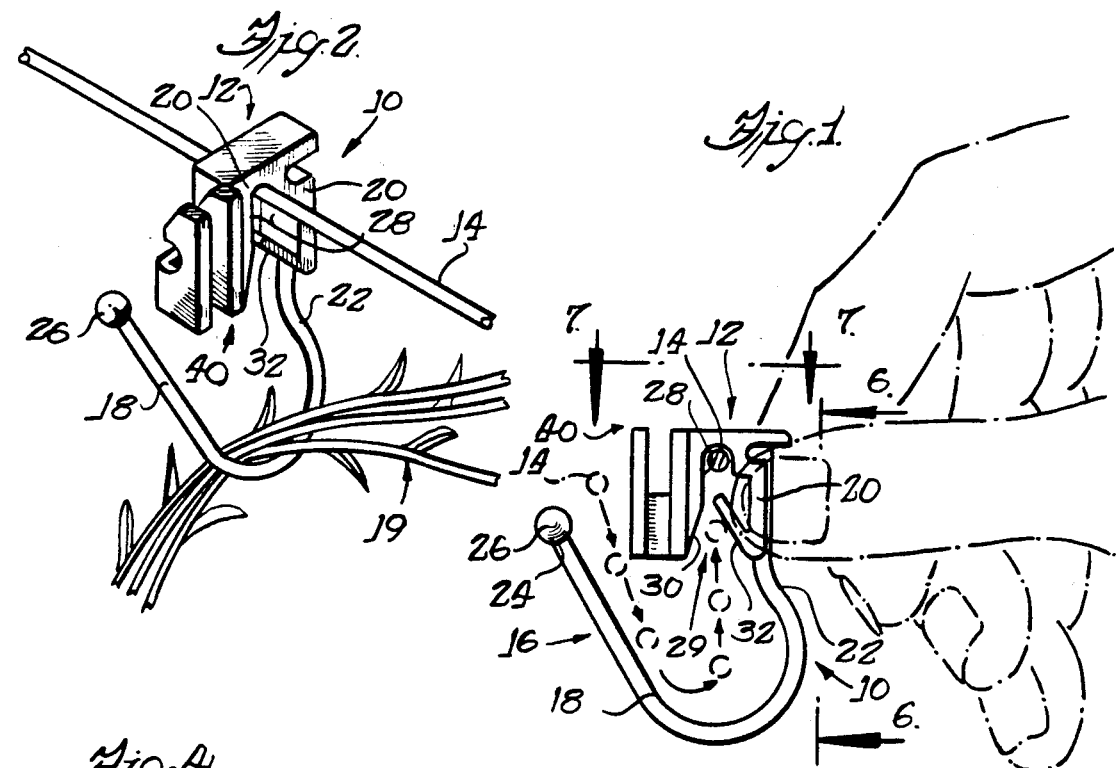
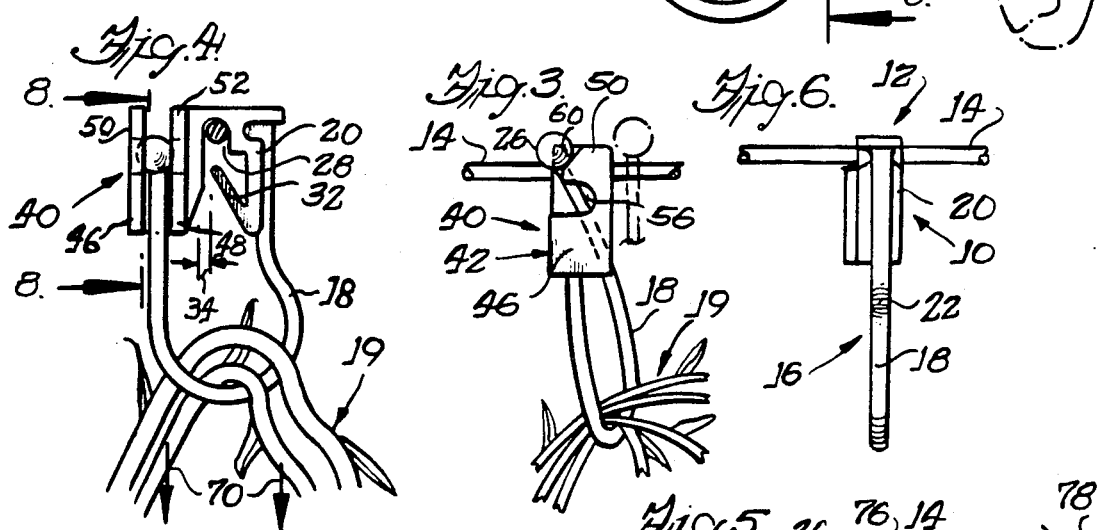
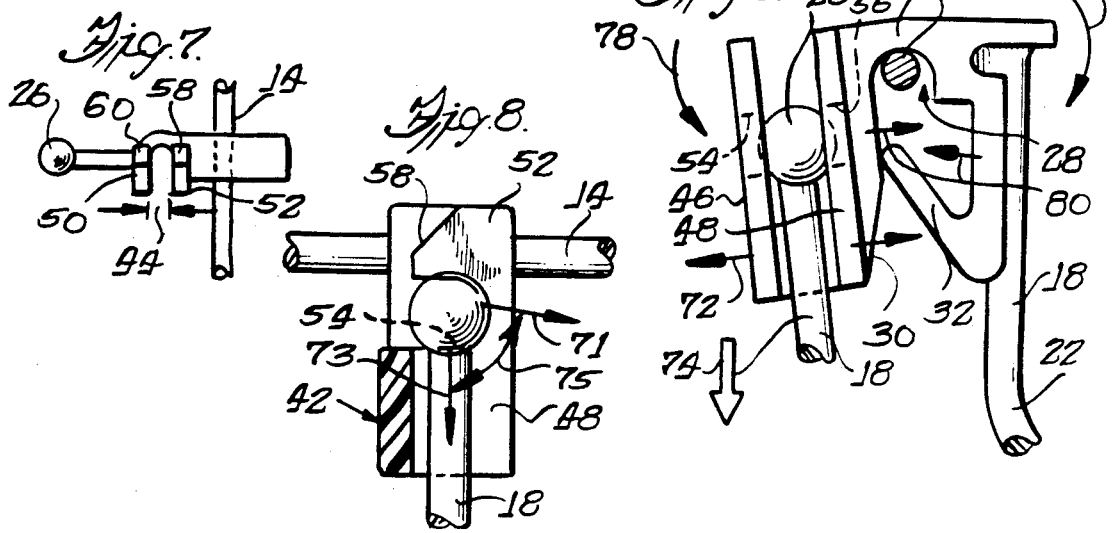

U.S. Patent Oct. 7, 1986 Sheet 2 of 2 4,615,140
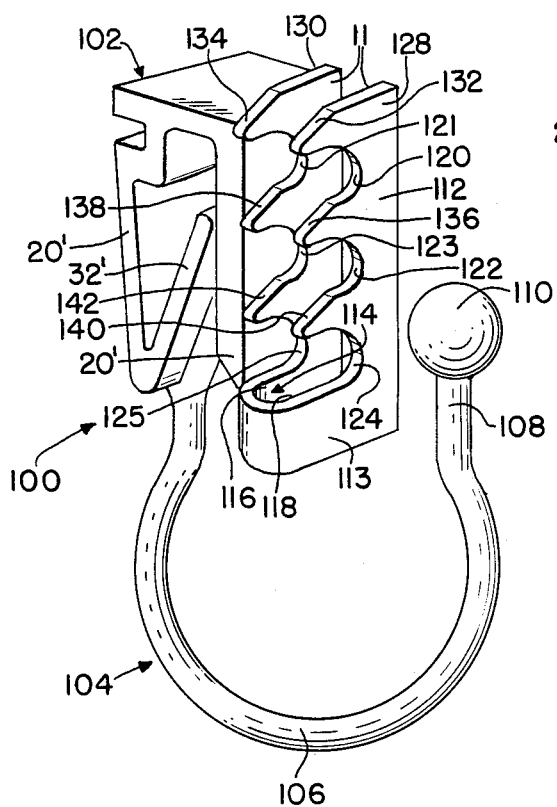
Fig. 9
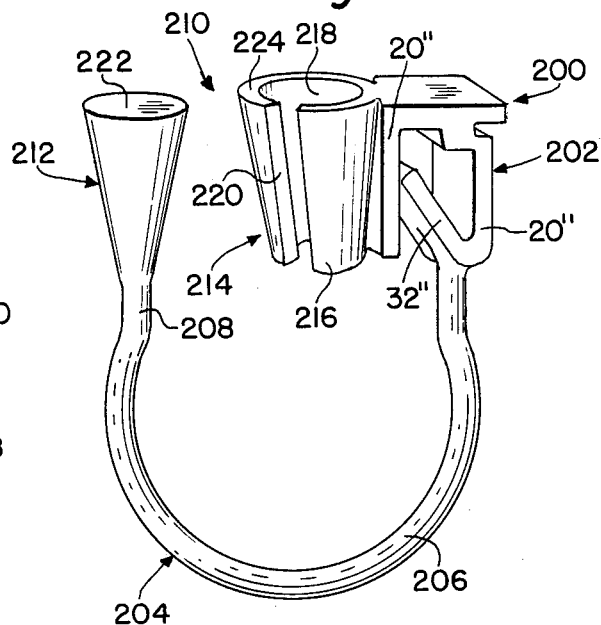
Fig. 10
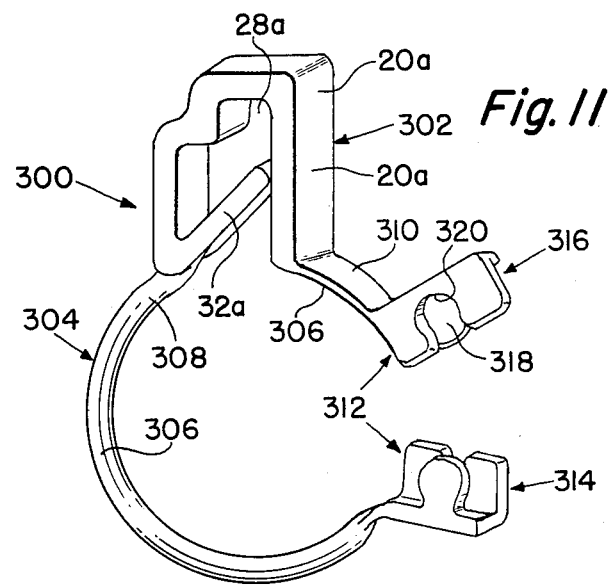
Fig. 11
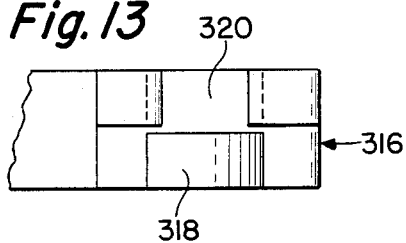
Fig. 13
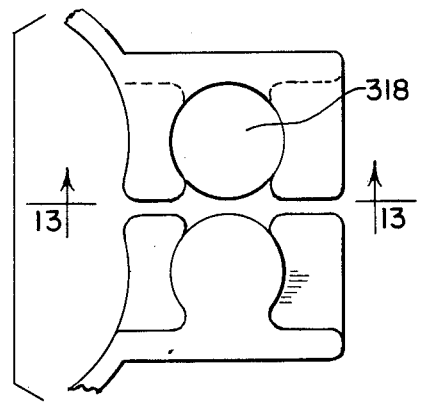
Fig. 12
Fig. 14

VINE TIE

This application is a continuation-in-part of prior application Ser. No. 477,112, filed on Mar. 21, 1983, entitled Vine Tie.

BACKGROUND OF THE INVENTION

The invention is directed generally to flexible tie members and more particularly to a novel one-piece integrally formed tie or clip apparatus for normally holding a vine or the like suspended from a suspended line.

While the invention may find utility in a variety of applications, the disclosure will be facilitated by addressing specifically the problem of suspending grape vines from suspended support wires. Historically, strips of fabric, string or the like have been utilized to attach or suspend grape vines from overhead lines or support wires. It will be appreciated, however, that this process is time consuming and relatively labor intensive. Moreover, care must be taken to assure that the string or fabric strips are not tied too tightly, to allow the vines sufficient room to grow within the tie.

To release the grape vines at the end of the season, when they are typically cut back, the fabric or string is cut and discarded, thus requiring new ties to be provided and installed in the following growing season.

OBJECTS AND SUMMARY OF THE INVENTION

Accordingly, it is a general object of the invention to provide a novel and improved tie or clip apparatus for suspending a vine or the like from a suspended line.

A more specific object is to provide such a tie apparatus which is re-usable and adapted to be left installed on an overhead line or support wire.

A related object is to provide a tie apparatus in accordance with the foregoing objects which is adapted to be attached to the support wire by a simple manipulation and further adapted to loosely surround a vine or the like in response to a second relatively simple manipulation.

Another object is to provide a tie apparatus which is adapted to be attached to the support wire by a simple manipulation and adapted to be adjustably connected to surround a vine or the like to increase the effective length of the tie apparatus.

A further object is to provide a tie apparatus in accordance with the foregoing objects which is adapted to release the suspended vine or the like in response to a predetermined amount of force applied thereto.

A related object is to provide a tie apparatus in accordance with the foregoing objects which may be relatively simply and inexpensively constructed as a one-piece integrally formed member, such as by an inexpensive molding process or the like.

Briefly, and in accordance with the foregoing objects, a tie apparatus in accordance with the present invention comprises line engaging means for releasably engaging a line and vine holding means for loosely surrounding a vine or the like; said vine holding means further comprising elongate flexible arm means integrally extending from said line engaging means and elastically deformable to define a loop for loosely surrounding the vine or the like; a first coupling means is integrally formed with said flexible arm means; a second coupling means cooperates with the first coupling means to form the flexible arm means into a loop configuration competely surrounding the vine or the like; one of the second coupling means being responsive to application of a predetermined amount of force to said flexible arm means substantially in at least one direction for releasing the other coupling means which opens the loop to permit removal of the vine or the like.

BRIEF DESCRIPTION OF THE DRAWINGS

The foregoing, as well as other objects, features and advantages of the invention will be more readily appreciated upon reading the following detailed description of the illustrated embodiment, together with reference to the drawings wherein:

FIG. 1 is a front elevation of a novel tie or clip apparatus illustrating the first embodiment of the invention, illustrating engagment thereof with an overhead line or support wire;

FIG. 2 is a perspective view of the tie or clip of FIG. 1 suspending a vine or the like from the overhead line;

FIG. 3 is a side elevation of the tie or clip of FIGS. 1 and 2 illustrating elastically deformable movement thereof for completely surrounding one vine;

FIG. 4 is a front view similar to FIG. 1 illustrating the tie or clip apparatus in a closed or locked configuration for normally surrounding and suspending the vine from the overhead wire and further illustrating one method of releasing the vines;

FIG. 5 is an enlarged view of a portion of FIG. 4 illustrating elastic deformation of portions of the clip apparatus for releasing the vine therefrom;

FIG. 6 is a side elevation taken generally in the plane of the line 6—6 of FIG. 1;

FIG. 7 is a top plan view taken generally in the plane of line 7—7 in FIG. 1;

FIG. 8 is an enlarged partial sectional view taken generally along the line 8—8 of FIG. 1;

FIG. 9 is a perspective view of a second embodiment of this invention;

FIG. 10 is a perspective view of a third embodiment of this invention;

FIG. 11 is a perspective view of a fourth embodiment of this invention;

FIG. 12 is an enlarged view of the fastener means for the fourth embodiment illustrated in FIG. 11;

FIG. 13 is a cross sectional view of the FIG. 12 illustration taken along the lines 13—13; and FIG. 14 is a side elevational view taken from the right side of FIG. 12.

DETAILED DESCRIPTION OF THE FIRST EMBODIMENT

Referring now to FIGS. 1–8, a vine tie or clip apparatus in accordance with the first embodiment of the invention is designated generally by the reference numeral 10. This tie or clip 10 includes a line engaging portion designated generally by the reference numeral 12 for surroundingly engaging an overhead support wire or line 14 and an integrally formed vine holding portion designated generally by the reference numeral 16 for surroundingly engaging one or more vines 18 to be suspended from the overhead support wire or line 14.

Referring initially to the vine supporting or holding portion 16, it will be seen that it includes an elongate flexible arm means 18 which depends integrally from a side or peripheral wall portion 20 of the wire engaging portion 12. Preferably, elongate flexible arm means 18 has a generally fishhook shape and curves outwardly somewhat as indicated at reference numeral 22 adjacent its junction with the peripheral or side wall 20. Additionally, an opposite free end or terminal end 24 of the arm 22 is provided with an integrally formed coupler means as illustrated in the form of an enlarged head portion 26 which is generally spherical in form. Preferably, the extent of the arm 18 is such as to normally locate the head 26 somewhat vertically below and laterally spaced apart from the wire engaging structure as best viewed in FIG. 1.

Referring next to the wire engaging structure 12, it will be seen to include the outer or peripheral wall portion 20 which defines a generally U-shaped passage 28 having an entrance 29 for receiving wire 14. The entrance 29 may be provided with a flared out lead-in surface 30 to facilitate placement and guidance of the wire 14 with respect to the passage 28. An additional flexible closure member 32 is provided for normally closing off a major fractional part of the entrance 29. As best viewed in FIG. 4, this flexible closure member 32 is angled inwardly of the passage and leaves a small gap or opening 34 in the otherwise closed entrance 29.

Preferably, flexible closure 32 is elastically movable inwardly of passage 28 for permitting ingress or entry of the wire 14 into the passage 28 as illustrated generally in FIG. 1. In this regard, the clip or tie may be manually gripped as generally illustrated in phantom line in FIG. 1 and moved with a relatively simple motion to achieve the motion relative to wire 14 generally indicated by the arrows associated with the wire 14 in FIG. 1. Preferably, however, the clip 10 is moved with the wire 14 remaining stationary. It will be recognized from the foregoing that the elastically deformable closure member 32 normally opposes removal of the wire or line 14 once positioned in the passage 28 as just described. In this regard, preferably the dimension across the gap 34 is somewhat smaller than the diameter of the wire 14. However, the passage 28 is preferably considerably larger than the cross-sectional dimension of the wire 14. Thus, the tie or clip 10 is held rotatably suspended from the wire 14.

Referring now to FIG. 2, it will be seen that the vine 19 or a similar object may be readily inserted into a partial loop defined by the generally fishhook-shaped flexible arm 18.

Reference is next invited to FIG. 3, which illustrates the interfitting and releasable locking of the arm 18 by virtue of the cooperating action between coupler means 26 and coupler means 40. In this regard, it will be appreciated that the flexible arm 18 is elastically deformable to accomplish the movement indicated in phantom line and by the arrows in FIG. 3 and into a "locked" or "closed loop" position illustrated in FIG. 4. The coupler means 40 is integrally formed adjacent to a side portion of the peripheral wall 20 and is generally co-extensive in height therewith. Coupler means 40 includes a channel portion 42 which comprises a generally U-shaped channel defining a cross sectional dimension (see FIG. 7). Generally co-extensive, parallel and spaced apart side walls 46 and 48 of the channel 42 define dimension 44 which is somewhat less than the diameter of the spherical head 26.

Extensions 50 and 52 of the side walls 46 and 48 define generally U-shaped locking recesses 54 and 56 which are dimensioned for receiving opposite outer edge portions of the spherical head member of coupler means 26. Interior surfaces of the recesses 54, 56 are semicircular and define diameters somewhat smaller than the diameter of spherical head 26. Accordingly, the locking recesses 54 and 56 are generally congruent and coaxially located (with each other) on the spaced apart extensions 50 and 52.

Cooperatively, a pair of cam lead-in surfaces 58, 60 are formed on upper edges of the extensions 50, 52 for slideably guiding the spherical head member 26 around the extensions and into engagement with the locking recesses 54, 56 as illustrated generally in FIGS. 3 and 4. In this regard, flexible arm 18 is sufficiently elastically deformable to permit this motion. This elastically deformable arm resiliently tends to return toward its undeformed position illustrated in FIGS. 1 and 2, such that the head portion 26 is urged in a direction so as to encourage or facilitate locking engagement with the respective locking recesses 54, 56.

Advantageously, the elongate arm 18 defines a sufficiently large enclosed loop, as illustrated in FIG. 4, to permit substantial growth of the vine 19 once loosely surrounded and suspended from the overhead support wire or line 14. At the end of a growing season, the vine may readily be removed from the clip or tie apparatus 10 of the invention by the simple expedient of grasping the vine 19 and pulling sharply generally in a downward direction as indicated by arrows 70 (see FIG. 4). Referring to FIG. 8, this releasing force may be applied, relative to the head 26, generally in any of a plurality of directions between arrows 71 (somewhat below the horizontal) and 73 (vertically down) as indicated by arrows 75.

As best viewed in FIG. 5, this force or motion will cause a first cam surface defined generally by spherical head 26 to engage or cam against second cam surfaces generally defined by side wall extensions 50 and 52 about the recesses 54 and 56. When sufficient force is imparted to the head 26 by way of the arm or loop 18 and vine 19 as described, the side walls 46 and 48 and their extensions 50 and 52 will elastically deform as indicated generally by arrows 72. This permits slideable withdrawal of the head 26 from the locking recesses 54 and 56, generally through the expanded or deformed channel 42 and/or extensions 50, 52, for example, as indicated generally by the arrow 74.

Upon removal of the vine 19, the clip or tie apparatus 10 is advantageously left suspended or hanging from the overhead line or support wire 14 for later use as desired.

As best illustrated in FIG. 5, the structure of the invention prevents disengagement of the wire or line engaging portion 12 during the foregoing removal operation. It will be seen that the motion or force indicated by line 70 (FIG. 4) or 71, 73 (FIG. 8) will also cause a hinge-like deformation of a central or apical (and preferably relatively thinner) portion 76 of the peripheral wall 20. This in turn causes fulcruming of respective sides thereof as indicated generally at arrows 78. This motion causes relative inward collapse or movement of the facing inner side wall surfaces of the passage 28 as indicated generally at arrows 80. It will be recognized that this inward collapse or motion urges the otherwise free end of the flexible closure member 32 into relatively firm engagement with the facing interior surface of the passage 28 to substantially prevent disengagement of the clip or tie apparatus 10 during the vine removal procedure just described. It is believed that the elastic return of the peripheral wall portions 20 to the undeformed state illustrated in FIGS. 1 and 2 is delayed sufficiently to prevent disengagement from the wire or line 14 as it "snaps" back when the force indicated by arrow 70 is released.

What has been described herein is a novel and improved clip or tie apparatus for suspending a vine or the like from an overhead line or support wire. Preferably, the foregoing structure is simply and inexpensively provided as a one-piece integrally formed structure, by a suitable molding process or the like.

It will be appreciated that the tie apparatus of this invention has been illustrated in FIGS. 1 through 8 as a fastening means for suspending vines from an overhead line or support wire. This tie apparatus could be used for a variety of other applications, for example, it could be used as a fastening device for supporting drip hoses or for trellising. In addition to its advantages over the prior art structures of being able to be quickly fastened and unfastened, this invention is important for its reusability.

DETAILED DESCRIPTION OF THE SECOND EMBODIMENT

Referring now to FIG. 9, there is illustrated the second embodiment of this invention which is generally designated by the reference numeral 100. Tie or clip 100 includes a line engaging portion generally designated by the reference numeral 102 for surroundingly engaging an overhead support wire and an integrally formed vine holding portion generally designated by the reference numeral 104 for surroundingly engaging a vine to be suspended from the overhead support wire. The wire engaging portion 102 is identical in structure and function to wire engaging portion 12 of the first embodiment. Accordingly, like parts of wire engaging structure 102 to those of wire engaging structure 12 will be designated by adding a prime to the same reference numeral as the first embodiment.

The vine supporting portion 104 includes an elongate flexible arm means 106 which depends integrally from a side wall portion 20' of the wire engaging portion 102. Elongate flexible arm means 106 is identical in configuration to the first embodiment. The free end 108 of the arm 106 is provided with an integrally formed coupler means which is illustrated in FIG. 9 as a generally spherical ball head portion 110.

The major difference between the second embodiment compared to the first embodiment is that the vine holding portion 104 has an additional means to selectively adjust the effective length of the closed loop formed by flexible arm 106. This adjustment feature is provided by coupler means 112, which is integrally formed adjacent to the side portion of the peripheral wall 20'. Coupler means 112 includes a U-shaped wall member 113 which forms a channel portion 114 constructed as a generally U-shaped channel defining a cross sectional dimension identical to dimension 44 of the first embodiment (see FIG. 7). Generally co-extensive, parallel and spaced apart side walls 116 and 118 of channel 114 define this dimension, which is preferably somewhat less than the diameter of the spherical head 110. Located above U-shaped wall member 113 are a pair of parallel, spaced apart extensions 128 and 130.

The means for adjusting the effective length of the loop is provided by a continuous series of pairs of U-shaped locking recesses 120 and 121, 122 and 123, and 124 and 125 formed integrally with extensions 128 and 130. Each of these pairs of locking recesses are dimensioned for receiving the diametrically opposite outer edge portions of the spherical head member of coupler means 110. The interior surfaces of each pair of recesses are semicircular and define diameters somewhat smaller than the diameter of the spherical head 110. Each pair of locking recesses are generally congruent and coaxially located with respect to each other on the spaced apart extensions 128, 130. The pairs of locking recesses are stacked in a continuous series along the spaced apart extensions 128 and 130.

A first pair of cam lead-in surfaces 132 and 134 are formed on the upper edges of the extensions 128 and 130 for slideably guiding the spherical head member or first coupler means 110 around the extensions and into engagement with the first pair of locking recesses 120, 21. Likewise a second pair of cam lead-in surfaces 136, 138 slideably guide the spherical head member 110 into the second pair of locking recesses 122, 123. A third pair of cam lead-in surfaces 140, 142 slideably guide the spherical head member into the third pair of locking recesses 124, 125.

From the foregoing description, it will be appreciated that spherical head of coupler means 110 would be initially installed into the first pair of locking recesses 120 and 121. A pull on the flexible arm means 106 in a direction away from the wire holding portion 102 would cause the spherical head 110 to ride out of the first pair of locking recesses and be guided by cam lead-in surfaces 136, 138 into the second pair of locking recesses 122, 123. Similarly, a further pull on the flexible arm 106 would cause the head 110 to be pulled out of the second pair of locking recesses and be guided by the cam lead-in surfaces 140, 142 into the third pair of locking recesses 124, 125.

It will be appreciated that as the first coupler means 110 is displaced from the first locking recesses to the second locking recesses and then to the third locking recesses the effective length of the loop about the vines will be increased in three discreet increments. This adjustment of the effective length of the loop will be made automatically if the growth of the vine being held causes the loop opening to a larger position. Thus this adjustable feature provides a means to have a relatively firm grip on the vine from the beginning of the grape growing season to the end while accommodating the growth of the vine throughout the season.

The release of the vine at the end of the grape growing season is identical to that described wth reference to the First Embodiment. The spherical head 110 will be seated in locking recesses 124, 125. In this position the vine may be readily removed from tie apparatus 100 by grasping the vine and pulling sharply in a direction away from wire supporting engaging portion 102.

DETAILED DESCRIPTION OF THE THIRD EMBODIMENT

Referring now to FIG. 10 there is illustrated the third embodiment of this invention. The third embodiment is constructed as a one-piece integrally formed tie apparatus generally designated by the reference numeral 200, which comprises a line engaging portion 202 and a vine holding portion 204.

The line engaging portion 202 is identical in construction to the first embodiment and like parts are designated by the double prime reference numeral.

Vine holding means 204 comprises an elongate flexible arm member 206 which integrally depends from the line engaging portion 202. The remote end 208 of the flexible arm member 206 is adapted to be releasably coupled to the line engaging portion 202 by a fastener means 210. The fastening means 210 is comprised of two cooperating coupler members 212 and 214.

Coupler means 212 is integrally formed on the remote end 208 of flexible arm 206 and has a truncated conical configuration.

Coupler member 214 is integrally formed adjacent to the side portion of the peripheral wall 20" and is generally co-extensive in height therewith. Coupler member 214 has a generally truncated conical body portion 216 with a truncated conical channel 218. A lengthwise slot 220 is formed between the exterior of the body portion 216 to the channel portion 218 along the entire length of body portion 216. The body portion 216 is made of an elastically deformable material.

The third embodiment is used by placing the line engaging portion 202 over a line such as shown in FIG. 4. The remote end 208 of flexible arm member 206 is then wrapped around the vine and formed into a loop such that the coupler means 212 is brought into axial alignment with coupler member 214. The remote end 208 can readily be slipped through the slot 214 and the user will pull the coupler member 212 down into frictional engagement with coupler member 214. In this position the enlarged end portion 222 of coupler member 212 will be projecting above the upper end 224 of coupler member 214.

During the grape growing season, the vines grow larger. The third embodiment illustrated in FIG. 10 is designed to permit the loop surrounding the vine to automatically enlarge in response to the vine's growth by virtue of the increasing force on the flexible arm member 206 causing the coupler member 212 to be gradually pulled through the channel 218. It will be appreciated that the elasticity of the material selected for coupler member 214 and the length and taper of coupler member 212 relative to channel 218 can be selected to provide a predetermined range through which the effective length of the loop formed by the flexible elongate member 206 can increase in proportion to the increase in cross sectional size of the vine it holds.

At the end of the grape growing season, the vine being held by the elongate flexible member 206 is pulled in a direction away from the line engaging portion 202 to force the elastically deformable body portion 16" to spread slot 220 apart sufficiently to allow the coupler member 212 to be pulled completely through the channel 218 to thereby release the hold on the wire.

Because of the use of an elastically deformable material for the one-piece integrally formed tie apparatus 200, it will be appreciated that the tie apparatus 200 can be reused the next grape growing season in the same manner.

DETAILED DESCRIPTION OF THE FOURTH EMBODIMENT

Referring to FIG. 11, there is illustrated the fourth embodiment of this invention. The fourth embodiment comprises a one-piece integrally formed tie apparatus generally designated by the reference numeral 300 which comprises a line engaging portion 302 and a vine holding portion 304.

The line enaging portion 302 is identical in construction to that shown in the first embodiment and like parts will be designated by the lower case letter "a".

The vine holding portion 304 has a flexible arm member 306 of an elastically deformable material. The flexible arm member 306 is constructed of two separate lengths 308 and 310 which depend from the opposite ends of the peripheral wall portion 20a of line engaging portion 302.

The outer free ends of line segments 308 and 310 for elongate flexible arm member 306 are adapted to be connected together by virtue of a fastener means 312. Fastener means 312 is constructed of two identical coupler members 314 and 316 integrally formed at the remote end of elongate line segments 308 and 310, respectively.

As depicted in FIGS. 12 through 14, coupler member 316 is formed as a one-piece member of elastically deformable material comprising a lateral arrangement of a rounded prong 318 and arcuate shaped socket 320. The rounded socket 320 is made up of elastically resilient deformable material and has a shape similar to the shape of the prong 318 but of slightly smaller dimensions to provide a tight interfitting engagement. Coupler member 314 has an identical construction to coupler member 316 but with its prong 322 and rounded shaped socket 324 in reverse position relative to the prong 318 and socket 320 of coupler 316.

To use the fourth embodiment illustrated in FIG. 11, it will be appreciated that the wire engaging portion 302 is placed over a horizontally disposed wire in the same manner as the first three embodiments and that the vine is placed into the central area of the flexible arm member 306. The two coupler members 314 and 316 are then brought together. When squeezed together the rounded nose 318 will be held in a releasably locking engagement by socket 324 and the nose 322 of coupler member 314 will be held into a releasably locking engagement by rounded curve socket 320.

The holding power of fastener 312 is predetermined to cause the coupler members to become disconnected through the means of pulling the vine in a direction away from the line engaging portion 302 with a predetermined force. Once the fastener 312 becomes uncoupled, the vine can be readily removed and the tie apparatus 302 will remain on the wire for reuse during the next grape growing season.

While the invention has been illustrated and described above with reference to four embodiments, the invention is not limited thereto. Those skilled in the art may devise various alternatives, changes and modifications upon reading the foregoing description. Such alternatives, changes and modifications form a part of the present invention insofar as they fall within the spirit and scope of the appended claims.

I claim:

1. A one-piece, integrally formed tie apparatus for releasably suspending a view or the like from a line, comprising: line engaging means for releasably engaging said line; and vine holding means for loosely surroundingly holding said vine or the like; said vine holding means further comprising elongate flexible arm means integrally extending from said line engaging means and elastically deformable to form a loop for loosely surrounding said vine or the like; first coupling means connected to said flexible arm means and defining a first cam surface; second coupling means for engaging said first coupling means to close off said loop defined by said flexible arm means to thereby completely surround said vine or the like; said means defining a second cam surface for normally opposing release of said first coupling means from said second coupling means in at least one direction and responsible to application of a predetermined amount of force to said flexible arm means substantially in said at least one direction for releasing said first coupling means from said second coupling means to thereby open said closed lopp for permitting removal of said vine or the like therefrom said line engaging means comprises peripheral wall means defining a line receiving passage having an entrance and flexible closure means elastically deformable in a given direction for permitting entry and removal of said line with respect to said entrance and resiliently returnable for opposing removal of said line from said entrance, said peripheral wall means defining said line receiving passage further includes an elastically deformable portion also responsive to said force applied to said flexible arm in said at least one direction for urging said flexible closure means in a direction for fully closing off said entrance to said passage, said locking recesses being generally semicircular and defining diameters less than said predetermined diameter of said spherical coupling means which are aligned directly opposite one another along said sidewall extensions.

2. A one-piece, integrally formed tie apparatus for releasably suspending a view or the like from a line, comprising: line engaging means for releasably engaging said line; and vine holding means for loosely surroundingly holding said vine or the like; said vine holding means further comprising elongate flexible arm means integrally depending from said line engaging means and elastically deformable to define a loop for loosely surrounding said vine or the like; enlarged head means formed at a remote end of said flexible arm means; coupling means for engaging said head means to close off said loop defined by said flexible arm means to thereby completely surround said vine or the like; said coupling means including a U-shaped expandable channel of elastically deformable material integrally formed with said line engaging means, said U-shaped channel defining a through passageway and a lengthwise slot in communication with said passageway, said through passageway having a cross sectional portion smaller than a cross sectional portion of said enlarged head means to provide a recess for receiving said enlarged head means, said U-shaped channel expanding to release said enlarged head means in response to a predetermined amount of force to said flexible arm means in a direction away from said vine holding means to thereby permit the removal of said vine or the like therefrom.

3. Apparatus as defined in claim 2, wherein said line engaging means comprises peripheral wall means defining a line receiving passage having an entrance and flexible closure means elastically deformable in a given direction for permitting entry and removal of said line with respect to said entrance and resiliently returnable for opposing removal of said line from said entrance.

4. Apparatus as defined in claim 3, wherein said peripheral wall means defining said line receiving passage further includes an elastically deformable portion responsive to said force applied to said flexible arm in said at least one direction for urging said flexible arm in said at least one direction for fully closing off said entrance to said passage.

5. Apparatus as defined in claim 2, wherein said vine holding means comprises a plurality of locking recess means each defining internal surface means for complementray engagement with said enlarged head means in successive order and each having cam lead-in surface means for slideably guiding said enlarged head means into engagement with each of said locking recess means to thereby selectively adjust the effective length of said loop.

6. Apparatus as defined in claim 2, wherein said enlarged head means is substantially spherical in configuration.

7. Apparatus as defined in claim 6, further comprising sidewall extensions formed on said sidewall portions and generally semicircular locking recesses formed on said sidewall portion, said locking recesses having a diameter less than said predetermined diameter of said spherical head means and are aligned directly opposite one another along said sidewall extensions.

* * * * *